United States Patent Office 3,703,453
Patented Nov. 21, 1972

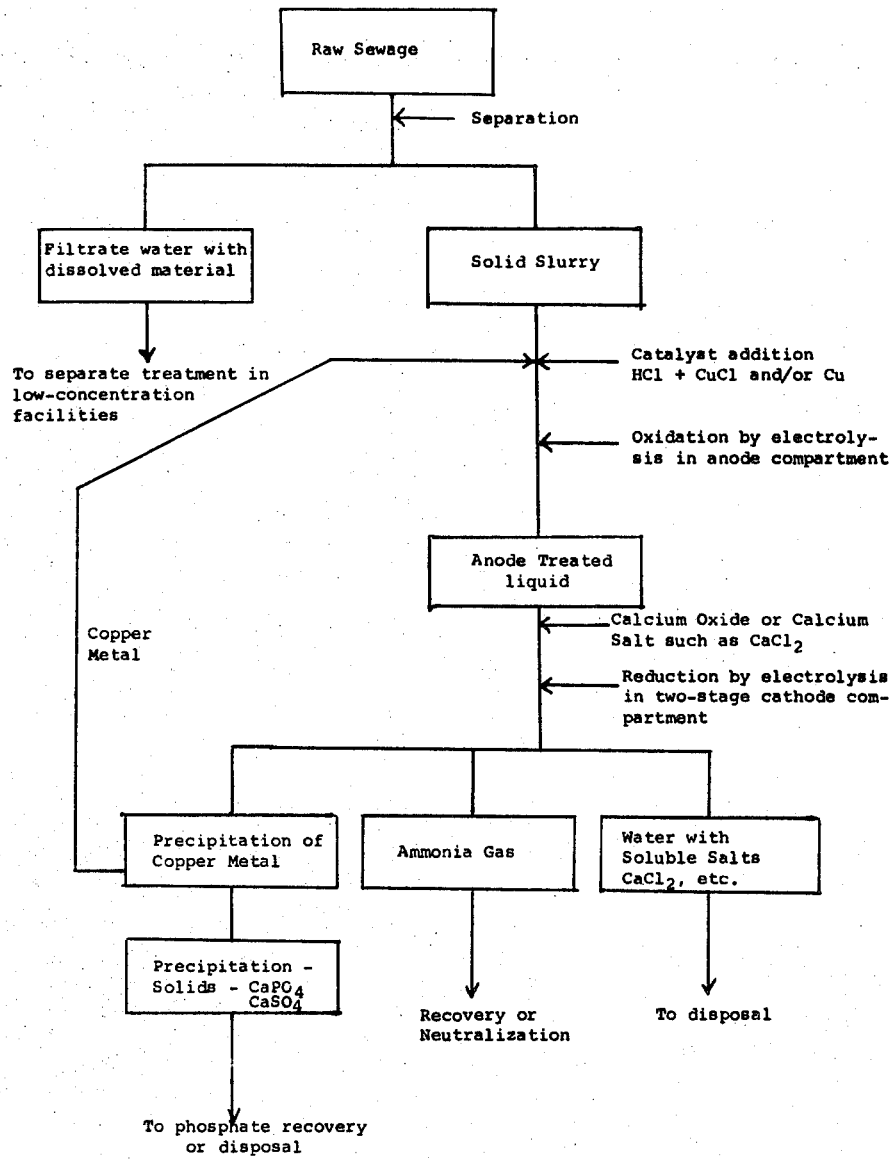

3,703,453
ELECTROLYTIC DESTRUCTION OF SEWAGE
John Gordy, Richmond, British Columbia, and Douglas R. Harris, Delta, British Columbia, Canada, assignors to Stellar Industries Ltd., Vancouver, British Columbia, Canada
Filed Sept. 1, 1970, Ser. No. 68,694
Int. Cl. C02c 5/12
U.S. Cl. 204—151                                              5 Claims

ABSTRACT OF THE DISCLOSURE

A method for the electrolytic destruction of waste material such as sewage, organic process waste materials, and the like; involving oxidation by electrolysis in the anode compartment of an electrolytic cell, in the presence of hydrochloric acid and cuprous chloride. This results in the formation of oxidation products. The resulting liquid may be reduced by electrolysis in the cathode compartment of the electrolytic cell, and this will permit recovery of the copper catalyst.

RELATED APPLICATIONS

This application is related to J. Gordy's copending application S.N. 558,419 filed June 17, 1966 now abandoned and his continuation-in-part U.S. application S.N. 14,172 filed Feb. 25, 1970 and to an application executed and filed concurrently herewith by John Gordy entitled "Electrolytic Oxidation of Organic Material."

DISCLOSURE

This invention relates to the electrolytic treatment of domestic and industrial wastes and waste water materials, such as sewage, organic process waste materials and the like. By the use of the present invention such waste materials are oxidized and destroyed by chemical action utilizing the electrolytic principle, and are reduced to non-pollutant substances.

A great deal of interest has centered in recent years on improvements in the methods of disposing of organic wastes, such as sewage. Known methods include separation by filtering or settling, drying the solids and using them as fill or burning them, or employing bacteria to work on the organic solids. U.S. Pat. No. 3,336,220 and entitled "Method of and Apparatus for Treating Sewage Containing Biologically Decomposable Organic Matter," discloses a method of stimulating the growth of bacteria for the destruction of sewage by the use of an electrical treatment to improve the efficiency of the biological action.

"Industrial Waste Disposal" by R. D. Ross (1968) Reinhold Book Corporation; also refers to the use of electrolysis in waste treatment.

In the case of sewage pollutants are transformed into non-polluting, harmless substances, or to useful, recoverable, materials.

The present invention, however, is particularly concerned with reducing the amount of residual solids or "sludge" from such treatments and also in reducing the treating time.

By the use of the present invention the formation of organic sludge is largely avoided. Organic compounds are converted to carbon dioxide, ammonia, nitrates and phosphates. The present invention is adapted to small or large scale operations as required and will find use in the form of self-contained units for home use and for use in vehicles. Cities and metropolitan areas will be able to install large highly efficient treatment plants and to operate them effectively and economically, without the production of large volumes of organic sludge. Many industries that presently have serious problems with organic waste disposal and reclamation of water, and will be able to overcome these problems by the use of the present invention. The present process has obvious benefits for operators of pulp mills, fish processing plants, fruit and vegetable canneries, cereal and grain processing plants, breweries, wineries, distilleries, detergent manufacturers, and similar industrial plants.

The present invention therefore provides a method of destroying waste material comprising oxidizing the material in an aqueous solution or slurry, in the presence of cuprous chloride-hydrochloric acid catalyst complex, in the anode compartment of an electrolytic cell, the anode and cathode compartments of the cell being separated by a porous membrane, said membrane preventing migration to the cathode of catalyst complex ions, cuprous ions, and suspended solids.

In another aspect the present invention provides such a method, adapted to the destruction of organic waste material, comprising oxidizing the material in an aqueous solution or slurry in the presence of a cuprous chloride—hydrochloric acid catalyst complex, in the anode compartment of an electrolytic cell, the anode and cathode compartments of the cell being separated by a porous membrane, said membrane preventing migration of catalyst complex ions, cuprous ions, and suspended solids, to the cathode.

In another aspect the present invention provides such a method, adapted to the destruction of organic sewage solid waste material comprising oxidizing the solids in an aqueous slurry in the presence of a cuprous chloride—hydrochloric acid catalyst complex, in the anode compartment of an electrolytic cell, the anode and cathode of the cell being separated by a porous membrane, then cycling the resulting liquid for reduction in the cathode compartment of the electrolytic cell, to yield a precipitate of insoluble salts and metals, evolution of gaseous ammonia, and water containing some soluble salts.

In a most preferred aspect the present invention provides a method of destroying organic waste material comprising the steps of separating raw organic sewage into a filtrate and a solids slurry, said solid slurry being oxidized in the anode compartment of an electrolytic cell in the presence of a cuprous chloride—hydrochloric acid catalyst complex, to yield an aqueous solution, said aqueous solution product being cycled for reduction in the cathode compartment of the electrolytic cell to yield in a first phase a solid precipitate comprising copper, and in a second phase a gas comprising largely ammonia, and water containing soluble salts, said copper precipitate being recycled to the anode compartment for the formation of further cuprous chloride catalyst, said ammonia gas being recovered as gas, or neutralized to form an ammonium salt, and said water being sent to disposal.

If calcium oxide or a soluble calcium salt, most preferably the chloride, is added to the mixture in the anode or cathode compartment, the reduction in the cathode compartment results in the precipitation of calcium phosphate, calcium sulfate, and other insoluble calcium salts.

A salt solution in the cathode compartment of an electrolytic cell will form hydroxyl ions with a resulting increase in pH. If calcium chloride is used for this purpose it has the added advantage of forming insoluble phosphates and sulfates.

The principles involved in the oxidation and reduction reactions which take place at the anode and cathode of an electrolytic cell respectively are well known, and reference may be had to widely known books such as "Textbook of Physical Chemistry" by Samuel Glasstone—Second edition, 9th printing, D. Van Nostrand & Company. However, these principles have not previously been applied to the invention which is presently disclosed and claimed.

The use of the hydrochloric acid-cuprous chloride complex as a catalyst for the electrolytic oxidation of organic compounds renders the present invention novel. The catalyst complex facilitates the removal of electrons from the mixture in the anode compartment. In the presence of hydrochloric acid, the copper will be present in the form of $(CuCl_2)^-$. The porous membrane prevents the $(CuCl_2)^-$ from migrating prematurely to the cathode, and physically separates the two compartments.

The anode treated solution is transferred to the cathode compartment for the purpose of recovering the copper by electrolytic deposition, as copper metal. The cathodic electrolysis reaction also neutralizes the highly acid solution in the presence of calcium chloride with the result that ammonium salts are decomposed and ammonia is evolved, along with precipitation of the insoluble calcium salts such phosphates and sulfates.

In addition to catalyzing the oxidation reaction in the anode cell, the cuprous chloride catalyst complex is frequently effective in deodorizing the slurry in the anode compartment.

While I do not wish to be limited I believe that the reaction occurring in the anode and cathode compartments are as follows:

Anode reactions (1) 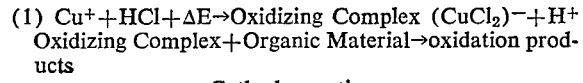
Oxidizing Complex+Organic Material→oxidation products Cathode reactions

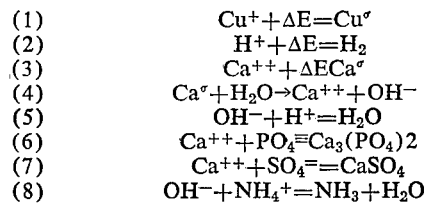

(1) $Cu^+ + \Delta E = Cu^\sigma$
(2) $H^+ + \Delta E = H_2$
(3) $Ca^{++} + \Delta E Ca^\sigma$
(4) $Ca^\sigma + H_2O \rightarrow Ca^{++} + OH^-$
(5) $OH^- + H^+ = H_2O$
(6) $Ca^{++} + PO_4^\equiv = Ca_3(PO_4)2$
(7) $Ca^{++} + SO_4^= = CaSO_4$
(8) $OH^- + NH_4^+ = NH_3 + H_2O$ In simple electrolysis the passage of current through an acid solution results in the formation of oxygen and hydrogen gas. However, the present process enables the oxidation of organic compounds to take place preferentially by the action of the cuprous chloride catalyst. Under oxidizing conditions carbon, hydrogen, sulfur and phosphorus are converted to their respective oxidation products.

Hydrochloric acid in concentrations of six normal (6 N) and the like, which is preferably employed in carrying out the present invention, will tend to hydrolyze proteins. The combination of hydrochloric acid and catalytic oxidation as employed in the present invention results in a very complex group of reactions but leads essentially to the destruction of the proteins. Ammonia is evolved which will of course form ammonium chloride in the acid solution. If carbon dioxide is evolved as a gas it can be vented to the atmosphere or can be recovered if desired.

The drawing which accompanies this application is a schematic flow sheet illustrating the typical steps in the practice of the present invention, as it relates to the destruction of sewage material.

Example 1

The apparatus employed in this test consisted of a simple electrolytic cell fabricated from glass fiber reinforced polyester, including two compartments separated by a porous ceramic "semipermeable" membrane having openings of approximately 5 microns. Graphite plates measuring 1″ x 8″ x 20″ were used for the anode and cathode. Electrical energy was provided by means of an integrated unit consisting of a variable transformer and rectifier, and was capable of providing one kilowatt of power. The power supply provided a variable source of direct current. All components of the apparatus were acid resistant and included as acid resistant pump, filters made from glass fiber and others from polypropylene cloth, and plastic storage bottles and tanks. The units were connected with polyvinyl chloride plastic tubing and valves. The anode compartments held a total of 20 gallons of solution, and the cathode compartments held 5 gallons.

The anode solution consisted of a 6 normal mixture formed from one part concentrated hydrochloric acid and one part water. Commercially available hydrochloric acid was used and is available at relatively low cost. The cuprous chloride catalyst was purchased as a copper salt initially and subsequently was produced by the action of hydrochloric acid on copper metal recovered in the process.

The organic sewage was derived from a toilet and consisted of human excreta, toilet paper, urine and water. Thus the sewage in this case consisted largely of cellulose, complex insoluble proteins, uric acid and soluble proteins. The sewage mixture was comminuted by passing through a garbage disposal unit. The ground mixture was filtered and the filtrate was separated from the solid slurry. This filtrate was treated separately in a low-concentration facility, with similar results.

The treatment of the solid organic sewage slurry part of the sewage input was carried out as follows. The slurry was run into the anode compartments of the electrolytic cell and the hydrochloric acid and cuprous chloride catalyst solution was added to the slurry to approximately double the volume of the slurry. In the present experiment, five pounds of cuprous chloride were used in a volume of approximately ten gallons of combined acid-catalyst-slurry anode mixture. The slurry was maintained in suspension by agitation. The electrolyzing current was turned on and the current was adjusted by means of the variable transformer to provide and maintain an electrolyzing current of about 10 amps per square foot of wet anode surface. The current is passed until the solids are destroyed, as evidenced by a clearing of the mixture. The current was then turned off and the solution drained through a filter and pumped up through a holding tank into the cathode compartment. The copper was recovered and was used to form new catalyst solution by reaction with hydrochloric action in order to conserve the copper catalyst.

The ammonia gas which evolved during the cathodic electrolysis was recovered as ammonium sulfate by reacting it with sulfuric acid. The clear watery effluent contained a small percentage of soluble salts such as calcium chloride, sodium chloride and the like. This water was sterile and clear and was suitable for disposal in a water course. The effluent water was tested for pH, biochemical oxygen demand (BOD), chemical oxygen demand (COD), total solids nutrient solids such as phosphates and nitrates and most probable number of coliform (MPN). The effluent was found to be satisfactory on all points.

BOD—zero
COD—200 p.p.m.
Phosphates—0.05%
Nitrates—trace
MPN—less than 2/100 ml.

By electrolytic action the copper metal which was introduced in the anode solution originally to form was preferentially deposited in the cathode compartment. 3 lbs. of calcium chloride was added to the cathode compartment and electrolysis continued until the formation of a precipitate of calcium phosphate and calcium sulfate, as well as other insoluble salts.

Example 2

In the example partially dewatered human solid waste was treated in the electrolytic cell in a manner similar to the procedures outlined in Example 1. Approximately 5 gallons of sewage input was placed in the anode compartments of the apparatus, which were separated from the centrally located cathode compartment by the porous membrane discussed above. The major part of the liquid filtrate was removed and held for later treatment. The solids remaining were estimated to constitute about 20 lbs. of slurry containing 40% water. 10 gallons of 31% hydrochloric acid, 10 gallons of water and 4 lbs. of cuprous chloride were introduced into the cells. The power was set at 3.2 volts for a current of 100 amps. This was continued for 1½ hours and then the voltage was raised to give a current of 175 amps, which increased slowly to 225 amps.

The cell was operated intermittently at various intermediate currents for several hours more. Samples were taken as follows—

(1) The anode cell.
(2) The cathode cell.
(3) The cathode cell and neutralized with CaO.

The results of the tests are shown in the table below—

|  | I (anode) | II (cathode) | III (final) |
|---|---|---|---|
| pH | | | 1.50 |
| C.O.D., p.p.m | 7,400.0 | 4,600.0 | 750.0 |
| Calcium (Ca) p.p.m | Absent | 1,300 | 16,840 |
| Total iron (Fe), p.p.m | 110.0 | 13.2 | 11.2 |
| Oatal phosphates ($PO_4$) p.p.m | 0.50 | 0.40 | 0.05 |
| Copper (Cu), p.p.m | 230.0 | 68.0 | 26.0 |
| Nitrates ($NO_2$), p.p.m | 0.09 | 0.03 | 0.05 |
| Nitrates ($NO_3$), p.p.m | 0.18 | 0.40 | 0.13 |
| Chlorides (Cl) (incl. available Cl) percent | 19.20 | 17.80 | 3.55 |
| Total solids (101° C.) percent | 2.70 | 0.80 | 4.80 |
| Hardness as ($CaCO_3$) p.p.m | | | 41,000 |

We claim:

1. A method of destroying waste material comprising adding a cuprous chloride-hydrochloric acid catalyst complex to an aqueous waste solution or slurry, in the anode compartment of an electrolytic cell, the anode and cathode compartments of the cell being separated by a porous membrane, said membrane preventing migration of catalyst complex ions, cuprous ions, and suspended solids, to the cathode, and electrolytically oxidizing the waste material in said anode compartment.

2. A method as in claim 1, in which the waste material in the anode compartment is a slurry of sewage solids and the resulting liquid is cycled to the cathode compartment for reduction, therein to yield a precipitate of insoluble salts and metals, evolution of gaseous ammonia, and water containing some soluble salts.

3. A method as in claim 2 in which the slurry of sewage solids is separated from raw sewage, the aqueous solution product is reduced in the cathode compartment of the electrolytic cell to yield in a first phase a solid precipitate comprising copper, and in a second phase a gas comprising largely ammonia, and water containing soluble salts, said copper precipitate recycled to the anode compartment for the formation of further cuprous chloride catalyst, said ammonia gas is recovered as such, or neutralized to form an ammonium salt, and said water is sent to disposal.

4. A method as in claim 3 wherein a calcium compound is added to the mixture in the cell thereby precipitating insoluble calcium salts in the cathode compartment.

5. A method as in claim 4 wherein the calcium compound is calcium chloride.

References Cited
UNITED STATES PATENTS

| | | | |
|---|---|---|---|
| 575,645 | 1/1897 | Hermite | 204—149 |
| 892,486 | 7/1908 | Woolf | 204—149 X |
| 937,210 | 10/1909 | Harris | 204—149 |
| 1,131,067 | 3/1915 | Landreth | 204—149 |
| 1,507,121 | 9/1924 | Landreth | 204—149 |
| 2,158,595 | 5/1939 | Slagle | 204—151 |
| 2,259,046 | 10/1941 | Roberts | 204—151 |
| 2,997,430 | 8/1961 | Föyn | 204—151 |

JOHN H. MACK, Primary Examiner

A. C. PRESCOTT, Assistant Examiner

U.S. Cl. X.R.

204—149